(12) United States Patent
Kwon et al.

(10) Patent No.: US 8,036,714 B2
(45) Date of Patent: Oct. 11, 2011

(54) TERMINAL, CONTROLLING METHOD THEREOF AND RECORDABLE MEDIUM FOR THE SAME

(75) Inventors: Tae Jung Kwon, Seoul (KR); Kwang Hyo Son, Guri-si (KR); Chang Young Park, Seoul (KR); In Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 507 days.

(21) Appl. No.: 12/314,224

(22) Filed: Dec. 5, 2008

(65) Prior Publication Data

US 2010/0056219 A1      Mar. 4, 2010

(30) Foreign Application Priority Data

Sep. 1, 2008   (KR) .................... 10-2008-0085851

(51) Int. Cl.
*H04B 1/38* (2006.01)

(52) U.S. Cl. ....................................................... 455/566
(58) Field of Classification Search ................. 715/769, 715/783; 455/566
See application file for complete search history.

(56) References Cited

U.S. PATENT DOCUMENTS

2008/0192021 A1*   8/2008   Lim et al. ...................... 345/173
2011/0004826 A1*   1/2011   Cho et al. ...................... 715/716

* cited by examiner

*Primary Examiner* — An Luu
(74) *Attorney, Agent, or Firm* — Birch, Stewart, Kolasch & Birch, LLP

(57) ABSTRACT

A mobile terminal including a broadcast receiving unit, a touchscreen including a broadcast picture area configured to display a broadcast picture received by the broadcast receiving unit, and a controller configured to display on the touchscreen a broadcast channel list including a list of broadcast channels in a first direction, and to display on the touchscreen a broadcast service list including a list of broadcast services corresponding to respective broadcast channels in a second direction opposite to the first direction.

26 Claims, 14 Drawing Sheets

FIG. 11
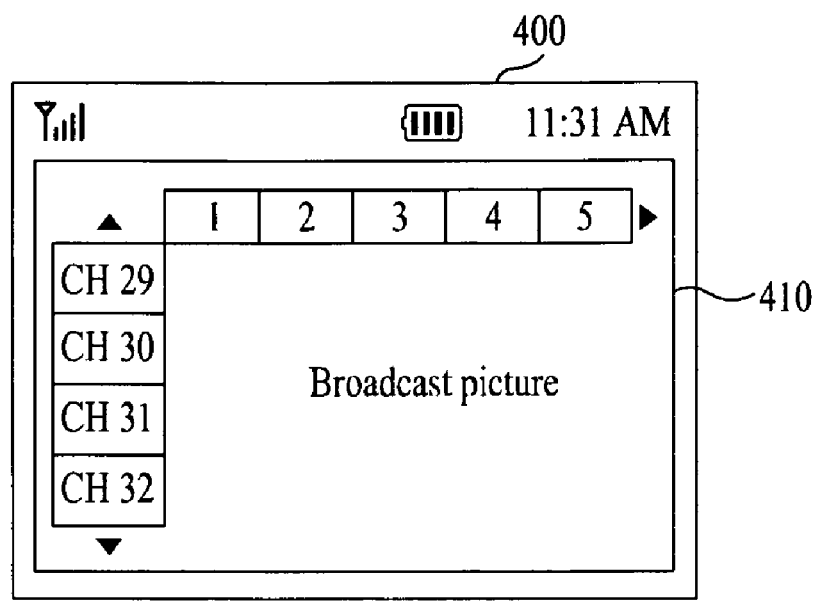
(11-1)
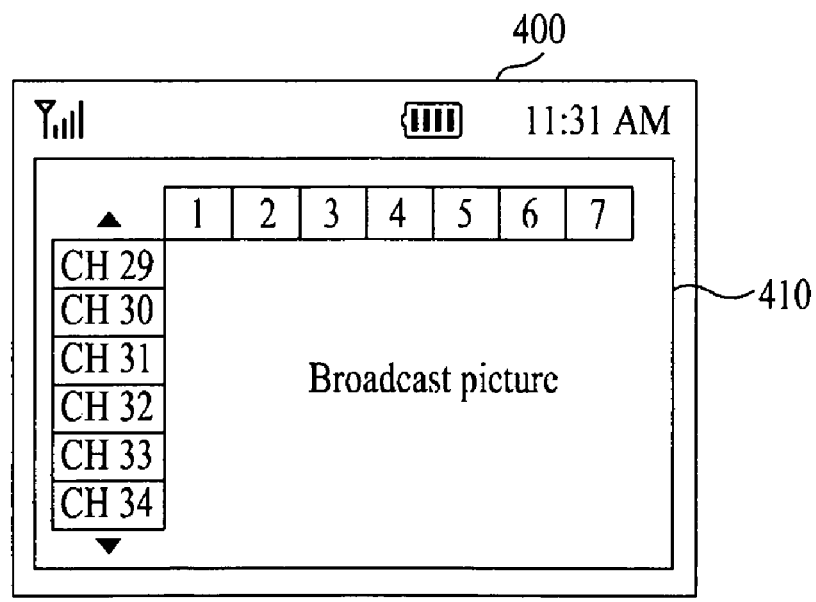
(11-2)

FIG. 14
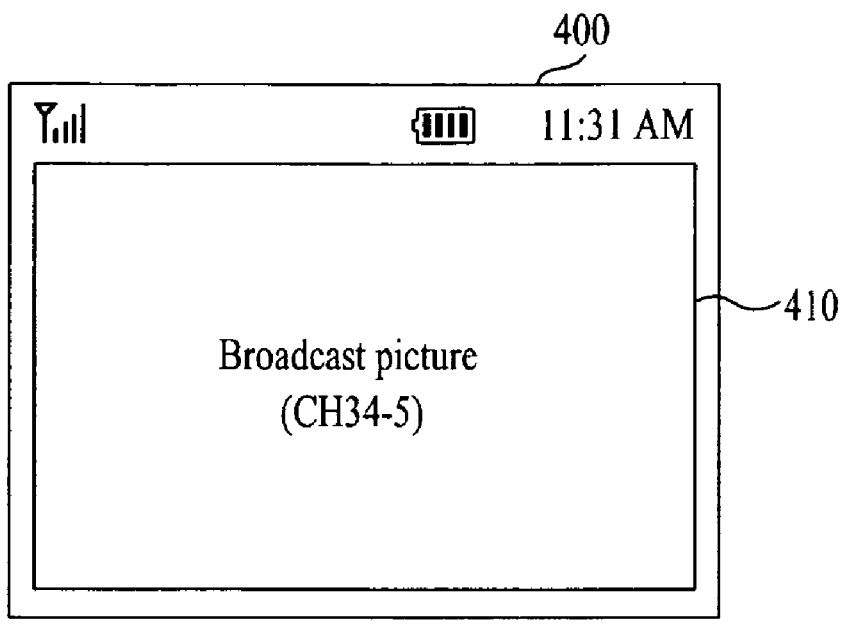
(14-1)
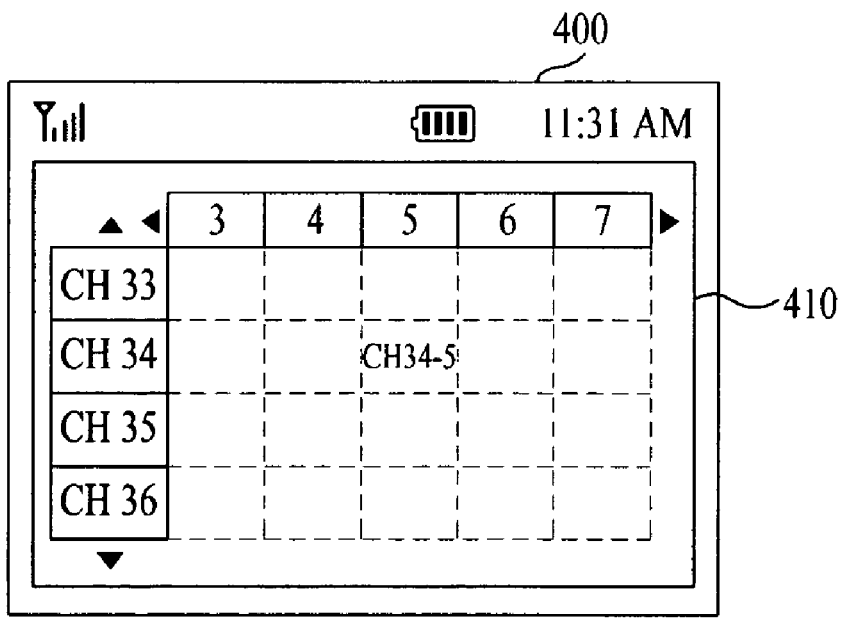
(14-2)

TERMINAL, CONTROLLING METHOD THEREOF AND RECORDABLE MEDIUM FOR THE SAME

This application claims the benefit of the Korean Patent Application No. 10-2008-0085851, filed on Sep. 1, 2008, which is hereby incorporated by reference as if fully set forth herein.

BACKGROUND OF THE INVENTION

1. Field of the Invention

The present invention relates to a mobile terminal and corresponding method that facilitates the selection of a specific broadcast channel from a plurality of broadcast channels received by a mobile terminal.

2. Discussion of the Related Art

Terminals now provide many additional services beside the basic call service. For example, user's can now access the Internet, play games, watch videos, listen to music, capture images and videos, record audio files, etc. Mobile terminals also now provide broadcasting programs such that user can watch television shows, sporting programs, videos etc.

Generally, terminals can be classified into mobile terminals and stationary terminals according to a presence or non-presence of mobility. Further, mobile terminals can be classified into handheld terminals and vehicle mounted terminals.

Recently, diverse broadcast programs are transmitted on more broadcast channels. However, it is often difficult for the user to easily view and select a channel among the plurality of provided channels.

SUMMARY OF THE INVENTION

Accordingly, one object of the present invention is to address the above-noted and other drawbacks.

Another object of the present invention is to provide a mobile terminal and corresponding method to facilitate the selection of a specific broadcast channel from a plurality of broadcast channels received by a mobile terminal.

To achieve these objects and other advantages and in accordance with the purpose of the invention, as embodied and broadly described herein, the present invention provides in one aspect a mobile terminal including a broadcast receiving unit, a touchscreen including a broadcast picture area configured to display a broadcast picture received by the broadcast receiving unit, and a controller configured to display on the touchscreen a broadcast channel list including a list of broadcast channels in a first direction, and to display on the touchscreen a broadcast service list including a list of broadcast services corresponding to respective broadcast channels in a second direction opposite to the first direction.

In another aspect, the present invention provides a method of controlling a mobile terminal, and which includes displaying a received broadcast picture on a broadcast picture area of a touchscreen of the mobile terminal, displaying on the touchscreen a broadcast channel list including a list of broadcast channels in a first direction, and displaying on the touchscreen a broadcast service list including a list of broadcast services corresponding to respective broadcast channels in a second direction opposite to the first direction.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 11 includes overviews of display screens illustrating a method of controlling a mobile terminal according to yet another embodiment of the present invention;

FIG. 14 includes overviews of display screens illustrating a method of controlling a mobile terminal according to another embodiment of the present invention.

DETAILED DESCRIPTION OF THE INVENTION

Reference will now be made in detail to the preferred embodiments of the present invention, examples of which are illustrated in the accompanying drawings.

Figure 1:
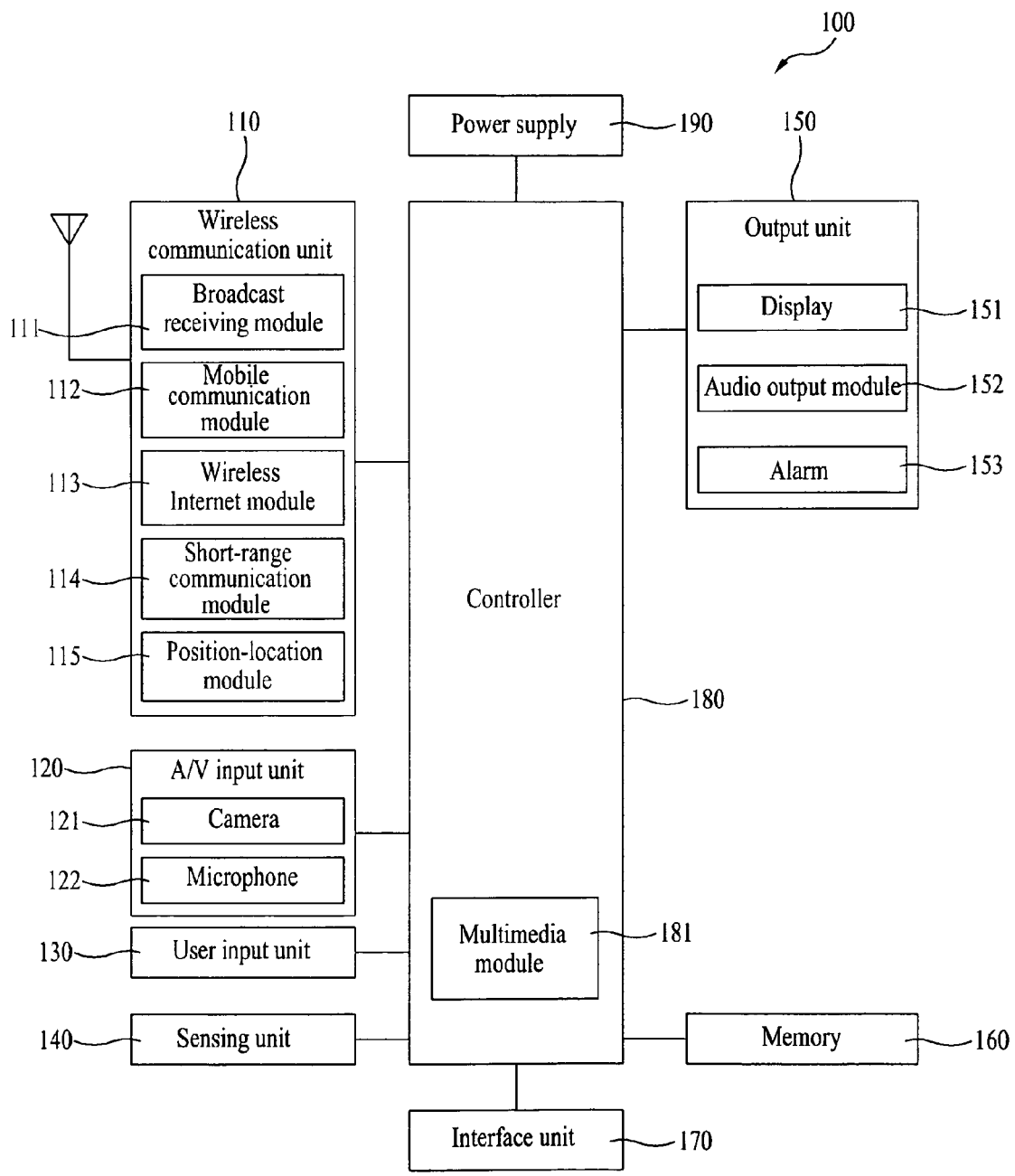
FIG. 1 is a block diagram of a mobile terminal according to an embodiment of the present invention.

FIG. 1 is a block diagram of a mobile terminal 100 according to an embodiment of the present invention. As shown, the mobile terminal 100 includes a wireless communication unit 110 including one or more components which permit wireless communication between the mobile terminal 100 and a wireless communication system or network within which the mobile terminal is located.

For non-mobile terminals, the wireless communication unit 110 can be replaced with a wire communication unit. The wireless communication unit 110 and wire communication unit can be commonly referred to as a communication unit. Also included is a broadcast receiving module 111 that receives a broadcast signal and/or broadcast associated information from an external broadcast managing entity via a broadcast channel. Multiple broadcast receiving modules 111 may also be provided.

The broadcast channel may include a satellite channel and a terrestrial channel. Further, the broadcast managing entity refers to a system which transmits a broadcast signal and/or broadcast associated information. Examples of broadcast associated information include information associated with a broadcast channel, a broadcast program, a broadcast service provider, etc. For example, the broadcast associated information may include an electronic program guide (EPG) of digital multimedia broadcasting (DMB) and an electronic service guide (ESG) of digital video broadcast-handheld (DVB-H).

In addition, the broadcast signal may be implemented, for example, as a TV broadcast signal, a radio broadcast signal, and a data broadcast signal. The broadcast signal may further include a broadcast signal combined with a TV or radio broadcast signal.

Also, the broadcast receiving module 111 is configured to receive broadcast signals transmitted from various types of broadcast systems. By a non-limiting example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as the media forward link only (MediaFLO®) and the integrated services digital broadcast-terrestrial (ISDB-T) system. Receiving multicast signals is also possible. Further, data received by the broadcast receiving module 111 may be stored in a suitable device, such as a memory 160.

Also included is a mobile communication module 112 that communicates wireless signals with one or more network entities such as a base station or Node-B. Such signals may represent, for example, audio, video, multimedia, control signaling, and data.

Further, a wireless Internet module 113 supports Internet access for the mobile terminal 100. This module may be internally or externally coupled to the mobile terminal 100. Suitable technologies for wireless Internet may include, but are not limited to, WLAN (Wireless LAN) (Wi-Fi), Wibro (Wireless broadband), Wimax (World Interoperability for Microwave Access), and HSDPA (High Speed Downlink Packet Access). The wireless Internet module 113 can also be replaced with a wire Internet module in non-mobile terminals. The wireless Internet module 113 and wire Internet module may be commonly referred to as an Internet module.

Further, a short-range communication module 114 facilitates relatively short-range communications. Suitable technologies for short-range communication may include, but are not limited to, radio frequency identification (RFID), infrared data association (IrDA), ultra-wideband (UWB), as well as the networking technologies commonly referred to as Bluetooth and ZigBee.

A position-location module 115 is also included and identifies or otherwise obtains the location of the mobile terminal 100. This module may be implemented using, for example, global positioning system (GPS) components which cooperate with associated satellites, network components, and combinations thereof.

The GPS module 115 is also able to precisely calculate current 3-dimensional position information based on longitude, latitude and altitude by calculating distance information and precise time information from at least three satellites and then applying triangulation to the calculated information. Location and time information are calculated using three satellites, and errors of the calculated location position and time information are then amended using another satellite. Further, the GPS module 115 is able to calculate speed information by continuously calculating a real-time current location.

Also included in the terminal is an audio/video (A/V) input unit 120 that is configured to provide audio or video signals input to the mobile terminal 100. As shown, the A/V input unit 120 includes a camera 121 and a microphone 122. The camera 121 receives and processes image frames of still pictures or video.

In addition, the microphone 122 receives an external audio signal while the portable device is in a particular mode, such as phone call mode, recording mode or voice recognition mode. This audio signal is processed and converted into digital data.

The portable device, and specifically the A/V input unit 120, typically includes assorted noise removing algorithms to remove noise generated in the course of receiving the external audio signal. Data generated by the A/V input unit 120 may be stored in the memory 160, utilized by an output unit 150, or transmitted via one or more modules of the communication unit 110. If desired, two or more microphones and/or cameras may be used.

FIG. 1 also illustrates a user input unit 130 that generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display, which will be described in more detail below.

Further, a sensing unit 140 provides status measurements of various aspects of the mobile terminal 100. For example, the sensing unit may detect an open/close status of the mobile terminal 100, relative positioning of components such as a display and keypad of the mobile terminal, a change of position of the mobile terminal or a component of the mobile terminal, a presence or absence of user contact with the mobile terminal, orientation or acceleration/deceleration of the mobile terminal, etc.

For example, if the mobile terminal 100 is configured as a slide-type mobile terminal, the sensing unit 140 may sense whether a sliding portion of the mobile terminal is open or closed. Other examples include the sensing unit 140 sensing the presence or absence of power provided by a power supply 190, and the presence or absence of a coupling or other connection between an interface unit 170 and an external device.

In addition, the interface unit 170 is implemented to couple the mobile terminal 10 with external devices. Typical external devices include wired/wireless headphones, external chargers, power supplies, storage devices configured to store data such as audio, video, and pictures, as well as earphones and microphones. The interface unit 170 may also be configured using a wired/wireless data port, audio input/output ports, video input/output port, a card socket for coupling to a memory card, a subscriber identity module (SIM) card, a user identity module (UIM) card, or removable user identity module (RUIM) card).

When the mobile terminal 110 is connected to an external cradle, the interface unit 170 becomes a passage for supplying the mobile terminal 100 with power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

Further, the output unit 150 includes various components that support the output requirements of the mobile terminal 100 such as a display 151 that is generally implemented to visually display information associated with the mobile terminal 100. For example, if the mobile terminal 100 is operating in a phone call mode, the display 151 provides a user interface or graphical user interface that includes information associated with placing, conducting, and terminating a phone call. As another example, if the mobile terminal 100 is in a video call mode or a photographing mode, the display 151 may additionally or alternatively display images associated with these modes.

One particular implementation includes the display 151 configured as a touch screen working in cooperation with an input device, such as a touchpad. This configuration permits the display 151 to function both as an output device and an input device.

Further, the display 151 may be implemented using display technologies including a liquid crystal display (LCD), a thin film transistor-liquid crystal display (TFT-LCD), an organic light-emitting diode display (OLED), a flexible display and a three-dimensional display.

The display 151 can also have a transparent configuration to enable the user to see through the display 151. This type of display is referred to as a transparent display. As one representative example for the transparent display, a transparent LCD or the like may be used.

Also, the mobile terminal 100 may include one or more display 151. An example of a two-display embodiment is one in which one display 151 is configured as an internal display viewable when the terminal 100 is in an opened position and a second display 151 configured as an external display viewable in both the open and closed positions.

The touchscreen can also be configured to detect a touch input pressure as well as a touch input position and size. Meanwhile, a proximity sensor 141 can be provided within or around the touchscreen. The proximity sensor 141 detects an object approaching a prescribed detecting surface or a presence or non-presence of an object existing around itself using an electromagnetic power or infrared rays without mechanical contact. Hence, the proximity sensor 141 is advantageous to a contact sensor in lifespan and utilization.

An example for an operational principle of the proximity sensor is explained as follows. First, if an object approaches a sensor detecting surface while an oscillation circuit oscillates a sine radio frequency, an oscillation amplitude of the oscillation circuit attenuates or stops. This change is converted to an electric signal to detect a presence or non-presence of the object. Thus, even if a material (except a metallic material) comes between the RF oscillation proximity sensor and the object, a proximity switch is able to detect the object without interference with the material.

When the proximity sensor is not provided, and if the touchscreen is electrostatic, the touchscreen can be configured to detect the proximity of a pointer through an electric field change attributed to the proximity of the pointer. Thus, when the pointer is placed in the vicinity of the touchscreen without being actually contacted with the touchscreen, the touchscreen can detect a position of the pointer and a distance between the pointer and the touchscreen.

In addition, an action for enabling the pointer approaching the touchscreen to be recognized as placed on the touchscreen is named 'proximity touch' and an action for enabling the pointer to actually come into contact with the touchscreen is named 'contact touch'. Also, a position at which the proximity touch is made to the touchscreen using the pointer corresponds to a position of the pointer vertically corresponding to the touchscreen when the pointer makes the proximity touch.

If the proximity sensor 141 is used, the proximity sensor 141 is able to sense a proximity touch and its pattern (e.g., proximity touch distance, proximity touch direction, proximity touch speed, proximity touch position, proximity touch moving state, etc.). In addition, the proximity sensor 141 is also able to output information corresponding to the sensed proximity touch action and the proximity touch pattern to the touchscreen.

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

The audio output module 152 functions in various modes such as call-receiving mode, call-placing mode, recording mode, voice recognition mode and broadcast reception mode. During operation, the audio output module 152 outputs audio relating to a particular function or status, such as call received, message received, or errors.

The output unit 150 is further shown having an alarm 153, which is used to signal or otherwise identify the occurrence of a particular event associated with the mobile terminal 100. Typical events include a call received, message received and user input received.

An example of a signal provided by the output unit 150 is tactile sensations. For example, the alarm 153 may be configured to vibrate responsive to the mobile terminal 100 receiving a call or message. As another example, vibration is provided by the alarm 153 responsive to receiving user input at the mobile terminal 100, thereby providing a tactile feedback mechanism. Further, the various signals provided by the components of the output unit 150 may be separately performed or performed using any combination of such components.

The memory 160 is used to store various types of data to support the processing, control, and storage requirements of the mobile terminal 100. Examples of such data include program instructions for applications operating on the mobile terminal 100, contact data, phonebook data, messages, pictures, and video. Moreover, data for various patterns of vibration and/or sound outputted for a touch input to the touchscreen can be stored in the memory 160.

Map information can also be stored in the memory 160, and thus the user's convenience can be increased by providing the map information to the user if necessary. Moreover, a recent use history or a cumulative use frequency of each menu in the mobile terminal can be stored in the memory 160.

The memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

A controller 180 is also included and controls the overall operations of the mobile terminal 100. For example, the controller 180 performs the control and processing associated with voice calls, data communications, instant message communication, video calls, camera operations and recording operations.

The controller 180 also includes a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input performed on the touchscreen as characters or images, respectively.

Further, the power supply 190 provides power used by the various components for the mobile terminal 100. The power may be internal power, external power, or combinations thereof.

Figure 2:
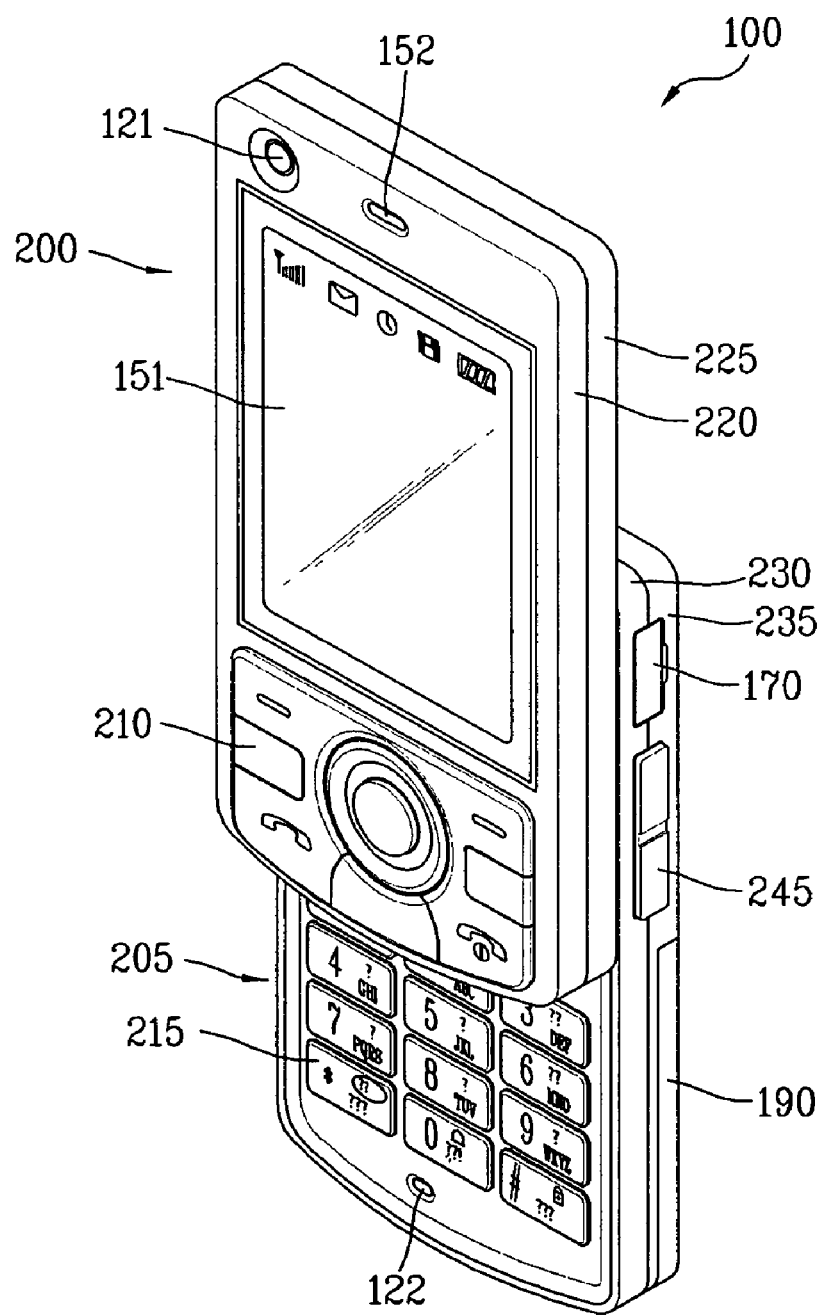
FIG. 2 is a front perspective view of a mobile terminal according to an embodiment of the present invention.

Next, FIG. 2 is a perspective view of a front side of a mobile terminal 100 according to an embodiment of the present invention. In FIG. 2, the mobile terminal 100 is shown having a first body 200 configured to slidably cooperate with a second body 205.

The user input unit 130 described in FIG. 1 may include a first input unit such as function keys and four directional keys 210, a second input unit such as keypad 215 and a third input unit such as side keys 245. The function keys 210 are associated with the first body 200, and the keypad 215 is associated with the second body 205. The keypad includes various keys such as numbers, characters, and symbols to enable a user to place a call, prepare a text or multimedia message, and otherwise operate the mobile terminal 100.

The first body 200 slides relative to the second body 205 between open and closed positions. Further, for a folder-type mobile terminal, the first body thereof folds and unfolds relative to the second body thereof between open and closed positions. In addition, for a swing-type mobile terminal, the first body thereof swings relative to the second body thereof between open and closed positions.

In a closed position, the first body 200 is positioned over the second body 205 in such a manner that the keypad 215 is substantially or completely obscured by the first body 200. In the open position, a user can access to the keypad 215. The function keys 210 are also conveniently configured for a user to enter commands such as start, stop and scroll.

The mobile terminal 100 is also operable in either a standby mode, in which it is able to receive a call or message and to receive and respond to network control signaling or an active call mode. Generally, the mobile terminal 100 functions in the standby mode in the closed position and in an active mode in the open position. This mode configuration may be changed as required or desired.

In addition, the first body 200 is formed from a first case 220 and a second case 225, and the second body 205 is formed from a first case 230 and a second case 235. The first case 230 and second case 235 are generally formed from a suitably rigid material, such as injection molded plastic, or formed using a metallic material, such as stainless steel (STS) and titanium (Ti).

One or more intermediate cases may also be provided between the first case 230 and second case 235 of one or both of the first body 200 and second body 205. The first body 200 and second body 205 are also generally sized to receive electronic components necessary to support operation of the mobile terminal 100.

In addition, the first body 200 is shown having the camera 121 and the audio output unit 152, which is configured as a speaker, positioned relative to the display 151. The camera 121 may also be constructed such that it can be selectively positioned relative to first body 200 such as by rotation or swiveling.

Further, the function keys 210 are positioned adjacent to a lower side of the display 151, which is shown implemented as an LCD or OLED. The display 151 may also be configured as a touch screen having an underlying touchpad which generates signals responsive to user contact with the touchscreen, such as with a finger or stylus.

Also, the second body 205 is shown having the microphone 122 positioned adjacent to the keypad 215 and having the side keys 245, which are one type of a user input unit as mentioned above, positioned along the side of second body 205. Preferably, the side keys 245 are configured as hot keys, such that the side keys 245 are associated with a particular function of the mobile terminal 100. The interface unit 170 is also shown positioned adjacent to the side keys 245, and the power supply 190 in a form of a battery is shown located on a lower portion of the second body 205.

Figure 3:
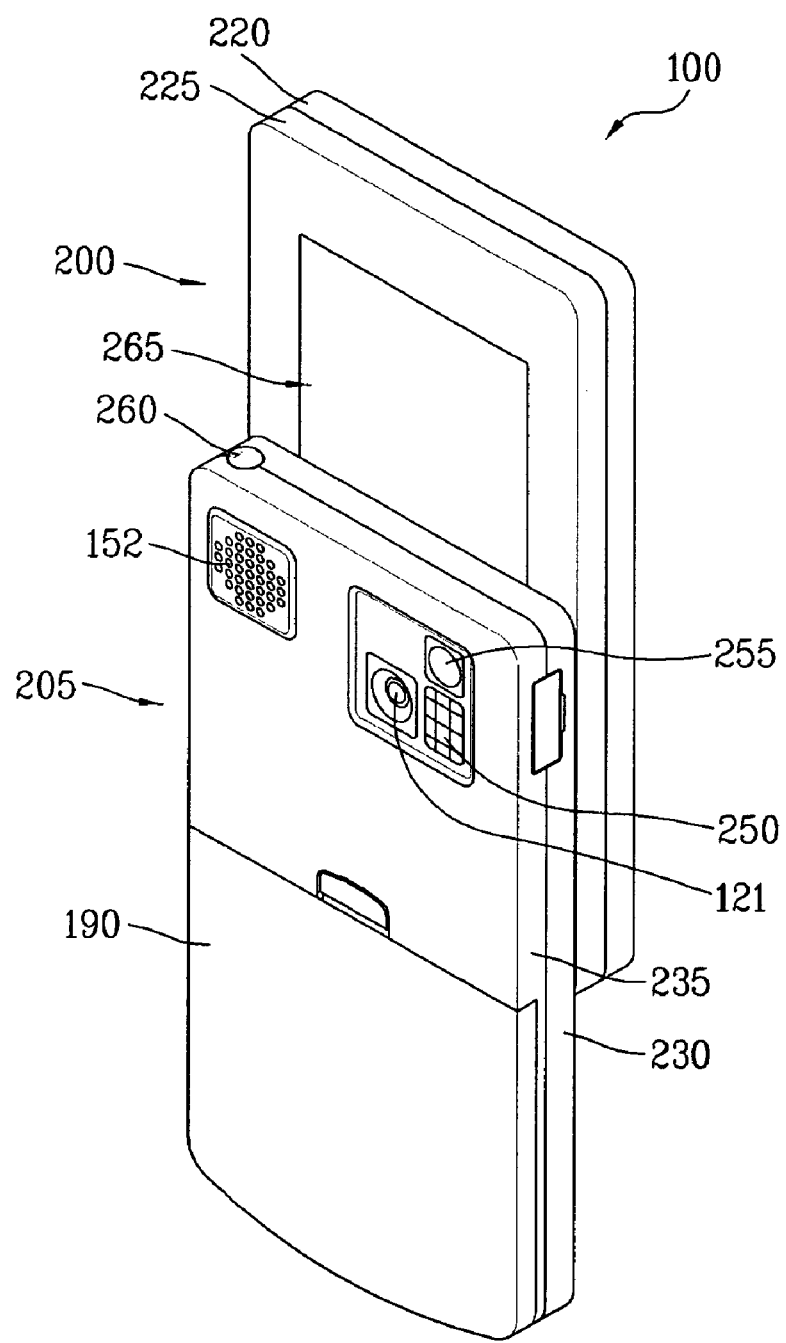
FIG. 3 is a rear perspective view of the mobile terminal shown in FIG. 2.

Next, FIG. 3 is a rear perspective view of the mobile terminal 100 shown in FIG. 2. In more detail, FIG. 3 shows the second body 205 having the camera 121 with an associated flash 250 and mirror 255. The flash 250 operates in conjunction with the camera 121, and the mirror 255 is useful for assisting a user to position the camera 121 in a self-portrait mode.

Further, the camera 121 of the second body 205 faces a direction which is opposite to a direction faced by the camera 121 of the first body 200 (FIG. 2). Each of the cameras 121 of the first body 200 and second body 205 may also have the same or different capabilities.

In one embodiment, the camera 121 of the first body 200 operates with a relatively lower resolution than the camera 121 of the second body 205. Such an arrangement works well during a video conference, for example, in which reverse link bandwidth capabilities may be limited. The relatively higher resolution of the camera 121 of the second body 205 (FIG. 3) is useful for obtaining higher quality pictures for later use or for communicating with other parties.

In addition, the second body 205 also includes an audio output module 152 located on an upper side of the second body and which is configured as a speaker. The audio output modules 152 of the first body 200 and second body 205 may also cooperate together to provide stereo output. Moreover, either or both of these audio output modules 152 may be configured to operate as a speakerphone.

Further, a broadcast signal receiving antenna 260 is shown located at an upper end of the second body 205. The antenna 260 functions in cooperation with the broadcast receiving module 111 (FIG. 1). The antenna 260 may also be fixed or configured to retract into the second body 205. Also, the rear side of the first body 200 includes a slide module 265, which slidably couples with a corresponding slide module located on the front side of the second body 205.

It is understood that the illustrated arrangement of the various components of the first body 200 and second body 205 may be modified as required or desired. In general, some or all of the components of one body may alternatively be implemented on the other body. In addition, the location and relative positioning of such components may be positioned at locations which differ from those shown by the representative figures.

In addition, the mobile terminal 100 of FIGS. 1-3 may be configured to operate within a communication system which transmits data via frames or packets, including both wireless and wired communication systems, and satellite-based communication systems. Such communication systems utilize different air interfaces and/or physical layers.

Examples of air interfaces utilized by the communication systems include frequency division multiple access (FDMA), time division multiple access (TDMA), code division multiple access (CDMA), the universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
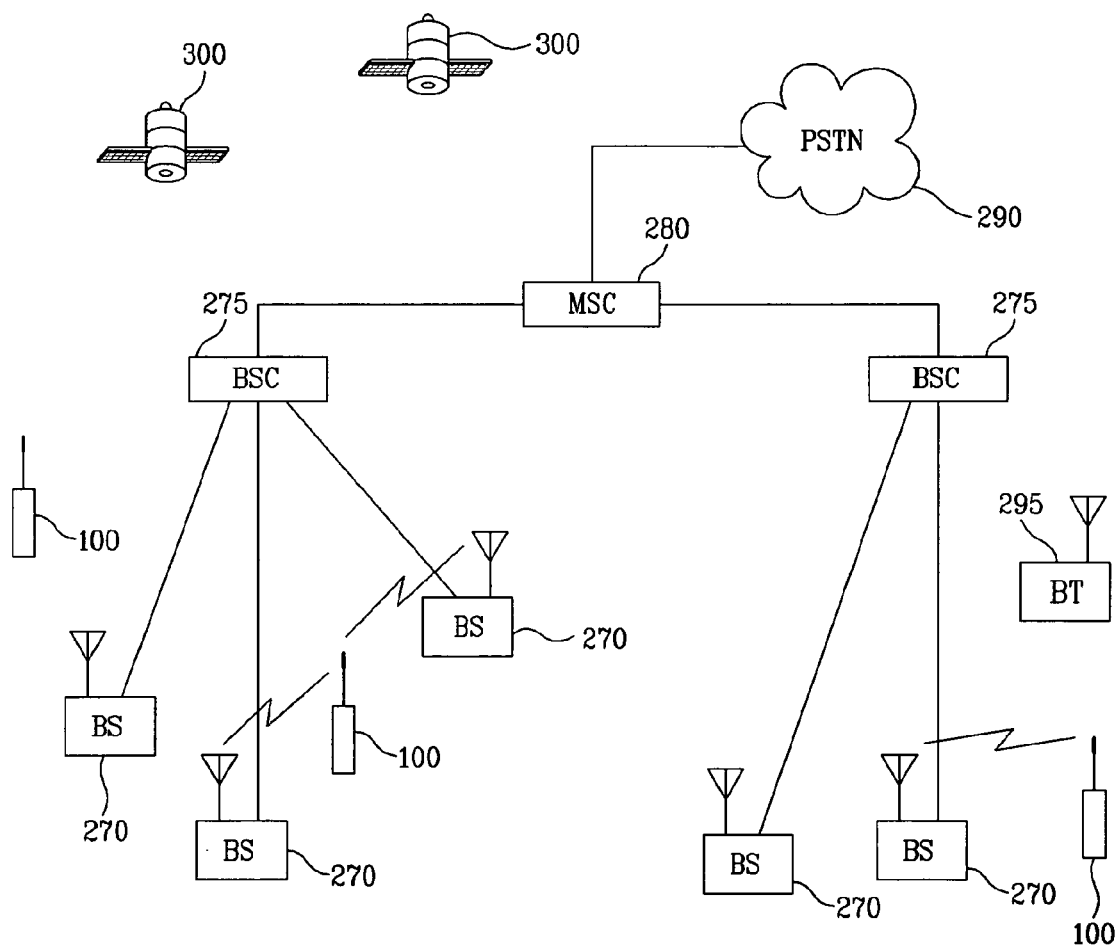
FIG. 4 is a block diagram of a wireless communication system in which a mobile terminal according to the present invention is operable.

Referring to FIG. 4, a CDMA wireless communication system is shown having a plurality of mobile terminals 100, a plurality of base stations 270, a plurality of base station controllers (BSCs) 275, and a mobile switching center (MSC) 280. The MSC 280 is configured to interface with a public switch telephone network (PSTN) 290. The MSC 280 is also configured to interface with the BSCs 275.

Further, the BSCs 275 are coupled to the base stations 270 via backhaul lines. The backhaul lines may be configured in accordance with any of several interfaces including, for example, E1/T1, ATM, IP, PPP, Frame Relay, HDSL, ADSL, or xDSL. The communication system may also include more than two BSCs 275.

Also, each base station 270 may include one or more sectors, each sector having an omnidirectional antenna or an antenna pointed in a particular direction radially away from the base station 270. Alternatively, each sector may include two antennas for diversity reception. Each base station 270 may also be configured to support a plurality of frequency assignments, with each frequency assignment having a particular spectrum (e.g., 1.25 MHz, 5 MHz).

In addition, the intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270. Further, the base stations 270 may also be denoted as "cell sites." Alternatively, individual sectors of a given base station 270 may be referred to as cell sites.

A terrestrial digital multimedia broadcasting (DMB) transmitter 295 is also shown broadcasting to mobile terminals 100 operating within the system. The broadcast receiving module 111 (FIG. 1) of the mobile terminal 100 is generally configured to receive broadcast signals transmitted by the DMB transmitter 295. Similar arrangements may be implemented for other types of broadcast and multicast signaling as discussed above.

FIG. 4 further depicts several global positioning system (GPS) satellites 300. Such satellites facilitate locating the position of some or all of the mobile terminals 100. Two satellites are depicted, but useful positioning information may be obtained with greater or fewer satellites.

In addition, the position-location module 115 (FIG. 1) of the mobile terminal 100 is generally configured to cooperate with the satellites 300 to obtain desired position information. Other types of position detection technology, such as location technology may be used in addition to or instead of GPS location technology. Some or all of the GPS satellites 300 may alternatively or additionally be configured to provide satellite DMB transmissions.

During operation of the wireless communication system, the base stations 270 receive sets of reverse-link signals from various mobile terminals 100. Further, the mobile terminals 100 engage in calls, messaging, and other communications. Each reverse-link signal received by a given base station 270 is also processed within that base station 270. The resulting data is then forwarded to an associated BSC 275.

In addition, the BSC 275 provides call resource allocation and mobility management functionality including soft handoffs between the base stations 270. The BSCs 275 also route the received data to the MSC 280, which provides additional routing services for interfacing with the PSTN 290.

Similarly, the PSTN interfaces with the MSC 280, and the MSC 280 interfaces with the BSCs 275. The BSCs 275 control the base stations 270 to transmit sets of forward-link signals to the mobile terminals 100.

In the following description, a control method applicable to the above-configured mobile terminal 100 is explained with respect to various embodiments. It is understood that the following embodiments can be implemented independently or through combinations thereof. The following embodiments refer to the display 151 including a touchscreen 400.

Figure 5:
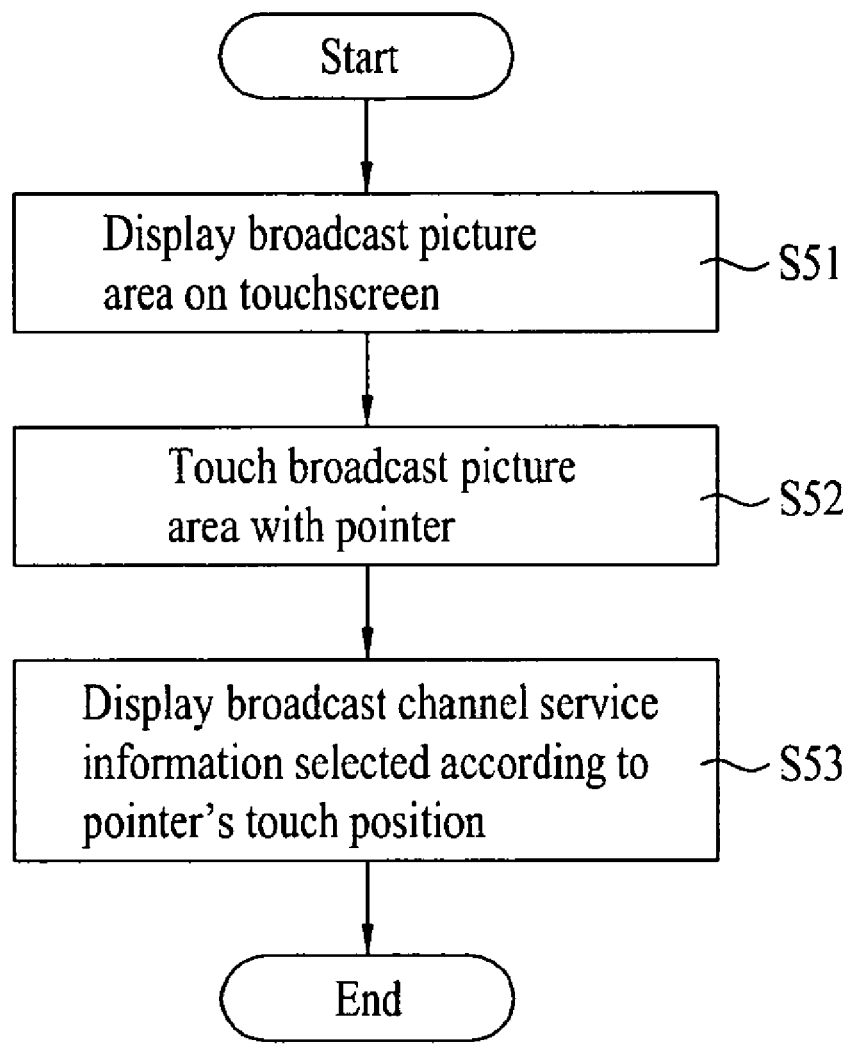
FIG. 5 is a flowchart illustrating a method of controlling a mobile terminal according to an embodiment of the present invention.

In more detail, FIG. 5 is a flowchart illustrating a method of controlling a mobile terminal according to an embodiment of the present invention. As shown in FIG. 5, the method includes displaying a broadcast picture area on the touchscreen 400 (S51), receiving a touch signal corresponding to a touching of the broadcast picture area (S52), and displaying a broadcast channel service information according to the received touch signal (S53).

Figure 6:
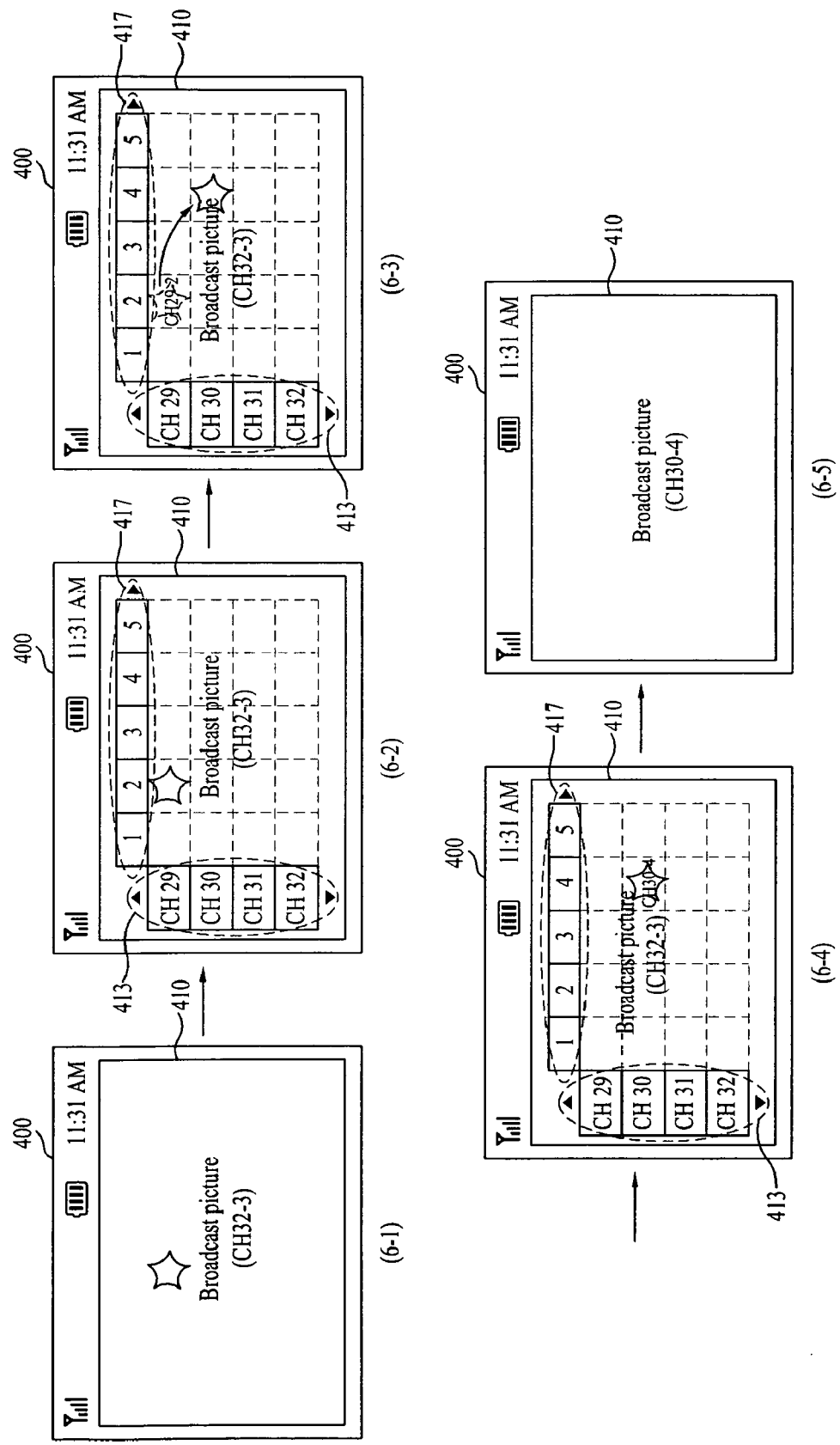
FIG. 6 includes overviews of display screens illustrating the operations shown in FIG. 5 according to an embodiment of the present invention.

FIG. 6 includes overviews of display screens illustrating the operations shown in FIG. 5. As shown in (6-1) of FIG. 6, the controller 180 displays a broadcast reception menu on the touchscreen 400 in the mobile terminal 100. As shown, the touchscreen 400 includes a broadcast picture area 410.

Further, the controller 180 controls the display 151 to display a broadcast picture received by the broadcast receiving module 111 in the broadcast picture area 410. This example assumes a broadcast picture according to a broadcast service 3 (CH32-3) of a broadcast channel 32 (CH32) is currently displayed in the broadcast picture area.

Further, the broadcast picture area 410 is touched (contact-touched or proximity-touched) with a pointer (e.g., finger or stylus pen). Then, as shown in (6-2) of FIG. 6, the controller 180 displays a broadcast channel list region 413 and a broadcast service list region 417 on the touchscreen 400.

In addition, in one example, the broadcast channel list region 413 is displayed on one side of the touchscreen 400 to list broadcast channels in a top-to-bottom (vertical) direction of the touchscreen 400. Also, the broadcast service list region 417 is displayed on the other side of the touchscreen 400 to list broadcast services in right-to-left (horizontal) direction of the touchscreen 400. Alternatively, the broadcast channel list region 413 and the broadcast service list region 417 can be arranged on the touchscreen 400 by being displayed horizontally and vertically, respectively.

In addition, (6-2) of FIG. 6 shows the broadcast channel list region 413 and the broadcast service list region 417 being fully overlapped with the broadcast picture area 410. Alternatively, the broadcast channel list region 413 and the broadcast service list region 417 can be configured to be partially overlapped with the broadcast picture area 410. Therefore, because the broadcast channel list region 413 and the broadcast service list region 417, as shown in (6-2) of FIG. 6, are displayed on the edge parts of the broadcast picture area 410, respectively, a terminal user is still able to view the broadcast picture that is being displayed in the broadcast picture area 410.

For instance, according to the broadcasting standard such as the DVB-T (digital video broadcast-terrestrial) standard, a plurality of broadcast services (CH29-1, Ch29-2, CH29-3, . . . ) can be provided on a single broadcast channel (e.g., CH29).

Also, each corresponding broadcast channel has a predetermined bandwidth, and the broadcast services of the corresponding broadcast channel are within the predetermined bandwidth for the corresponding broadcast channel. Thus, to select a broadcast channel, a terminal user selects not only a specific one of a plurality of broadcast channels but also a specific one of a plurality of broadcast services.

Further, the broadcast channels are listed in the broadcast channel list region 413 and the broadcast services are listed in the broadcast service list region 417. A method of selecting a specific one of a plurality of broadcast channels and a specific one of a plurality of broadcast services using the broadcast channel list region 413 and the broadcast service list region 417 will now be explained in more detail with reference to FIGS. 5 and 6.

That is, the broadcast picture area 410 is displayed on the terminal (S51), and a proximity touch is performed on a first position of the broadcast picture area 410 (S52). Then, as shown in (6-2) of FIG. 6, a broadcast channel CH29 of the broadcast channel list 413 corresponding to the first position in a horizontal direction is selected from a plurality of broadcast channels, and a broadcast service CH29-2 of the broadcast service list 417 corresponding to the first position in a vertical direction is selected from broadcast services of the corresponding broadcast channel.

The information on the broadcast service of the selected broadcast channel (hereinafter named 'broadcast channel service information') is displayed at the first position (S53). The broadcast channel service information can include a name and logo of the broadcast service of the selected broadcast channel, a currently broadcasted program name and the like. In FIG. 6, the broadcast channel service information is represented as 'CH29-2'.

In addition, if a service of a broadcast channel corresponding to the first position does not exist, information (e.g., 'none') indicating that the corresponding broadcast channel service does not exist can be displayed instead of the broadcast channel service information.

Subsequently, as shown in (6-3) of FIG. 6, another proximity touch is performed on a second position of the broadcast picture area 410. That is, as shown in (6-4) of FIG. 6, a broadcast channel CH30 of the broadcast channel list 413 corresponding to the second position in a horizontal direction is selected from a plurality of the broadcast channels, and a broadcast service CH30-4 of the broadcast service list 417 corresponding to the second position in a vertical direction is selected from the broadcast services of the corresponding broadcast channel.

The broadcast channel service information on the broadcast service of the selected broadcast channel is displayed as 'CH30-4' at the second position, for example, as shown in (6-4) of FIG. 6.

In addition, FIG. 6 shows that when the broadcast picture area 410 is touched, the broadcast channel list and the broadcast service list are displayed. However, the broadcast channel list and the broadcast service list can be displayed through other appropriate key manipulation (e.g., hot key manipulation) of the user input unit.

FIG. 6 also shows that a proximity touch is performed on a specific position of the broadcast picture area, and then the broadcast channel service information corresponding to the specific position is displayed. FIG. 6 also shows that a channel is switched to the broadcast service of the broadcast channel corresponding to the specific position. However, it is also possible to switch a channel to a broadcast service of a broadcast channel corresponding to the specific position based on a double touching of the specific position, for example.

FIG. 6 also illustrates a grid pattern being displayed to facilitate the selection of a specific broadcast channel and a broadcast service. That is, FIG. 6 shows a grid pattern being displayed as dotted lines on the touchscreen 400 in correspondence with the displayed broadcast channel list region 413 and broadcast service list region 417. Optionally, the grid pattern can not be displayed on the touchscreen. The user can also choose whether or not to display the grid pattern using the appropriate menu or touching operations according to an embodiment of the present invention.

Further, in FIG. 6, the broadcast channel list region 413 and the broadcast service list region 417 are partially overlapped with the broadcast picture area 410. However, because the broadcast channel list region 413 and the broadcast service list region 417 cover a portion of a broadcast region displayed in the broadcast picture area 410, the regions 413 and 417 can be displayed so as not to overlap with the broadcast picture area 410. This is explained in more detail with reference to FIG. 7 as follows.

Figure 7:
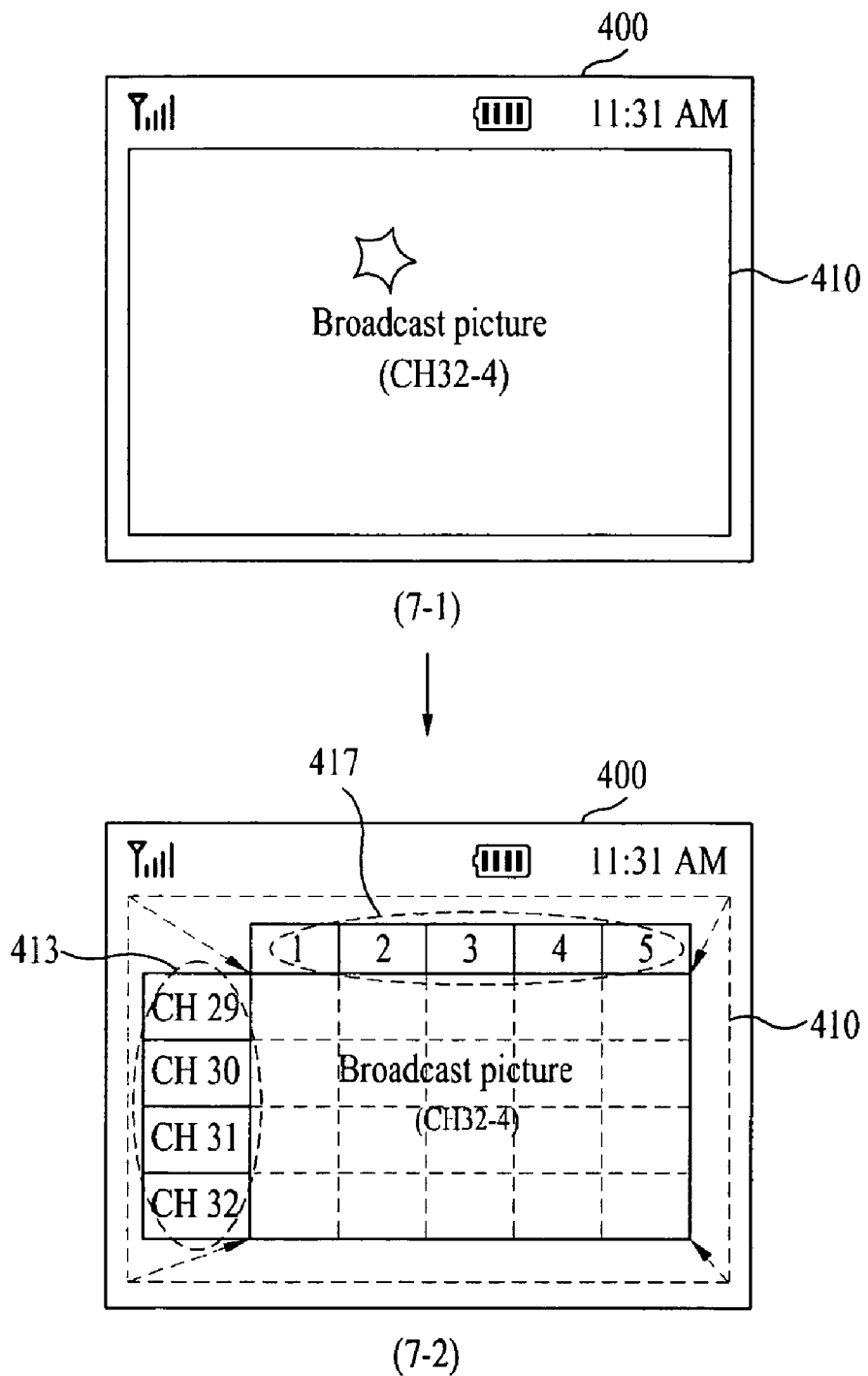
FIG. 7 includes overviews of display screens illustrating a broadcast channel list and broadcast service list being displayed so as not to overlap a broadcast area according to an embodiment of the present invention.

Referring to (7-1) of FIG. 7, the touchscreen 400 includes the broadcast picture area 410. Further, a broadcast picture received by the broadcast receiving module 111 is displayed in the broadcast picture area 410. (7-1) of FIG. 7 also illustrates the broadcast picture area 410 being touched with a pointer (e.g., finger or stylus pen).

Then, as shown in (7-2) of FIG. 7, a size of the broadcast picture area 410 is reduced to be smaller than an original size. Thus, the broadcast channel list region 413 and the broadcast service list region 417 can be displayed in the surplus area appearing due to the reduced broadcast picture area 410. Therefore, the broadcast channel list region 413 and the broadcast service list region 417 do not cover or overlap the broadcast picture area.

Figure 8:
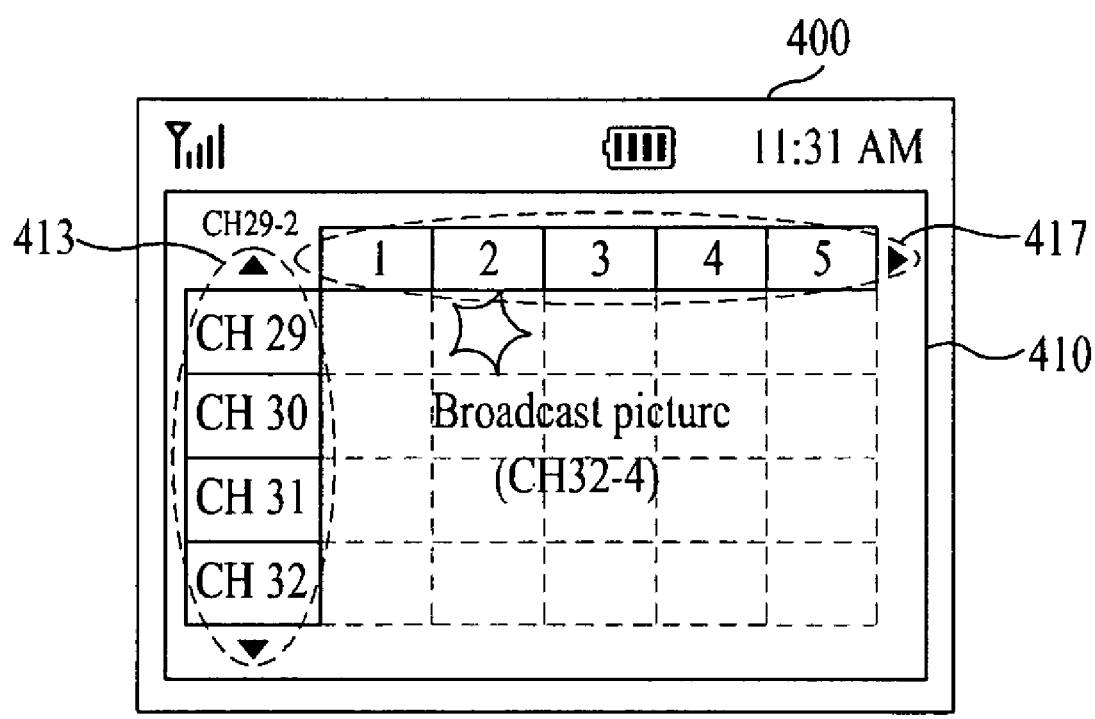
FIG. 8 is an overview of a display screen illustrating broadcast channel service information being displayed at a fixed position of a broadcast picture area according to an embodiment of the present invention.

In addition, in FIG. 6, the broadcast channel service information is displayed at the touched position (i.e., the first or second position). However, it is also to display the broadcast channel service information at a prescribed fixed position instead of the touched position. FIG. 8 illustrates this feature and shows the broadcast channel service information being displayed at the fixed position at the left top of the broadcast picture area 410. Other fixed positions are also available.

A method of controlling a mobile terminal according to another embodiment of the present invention will now be described with reference to FIG. 9.

Figure 9:
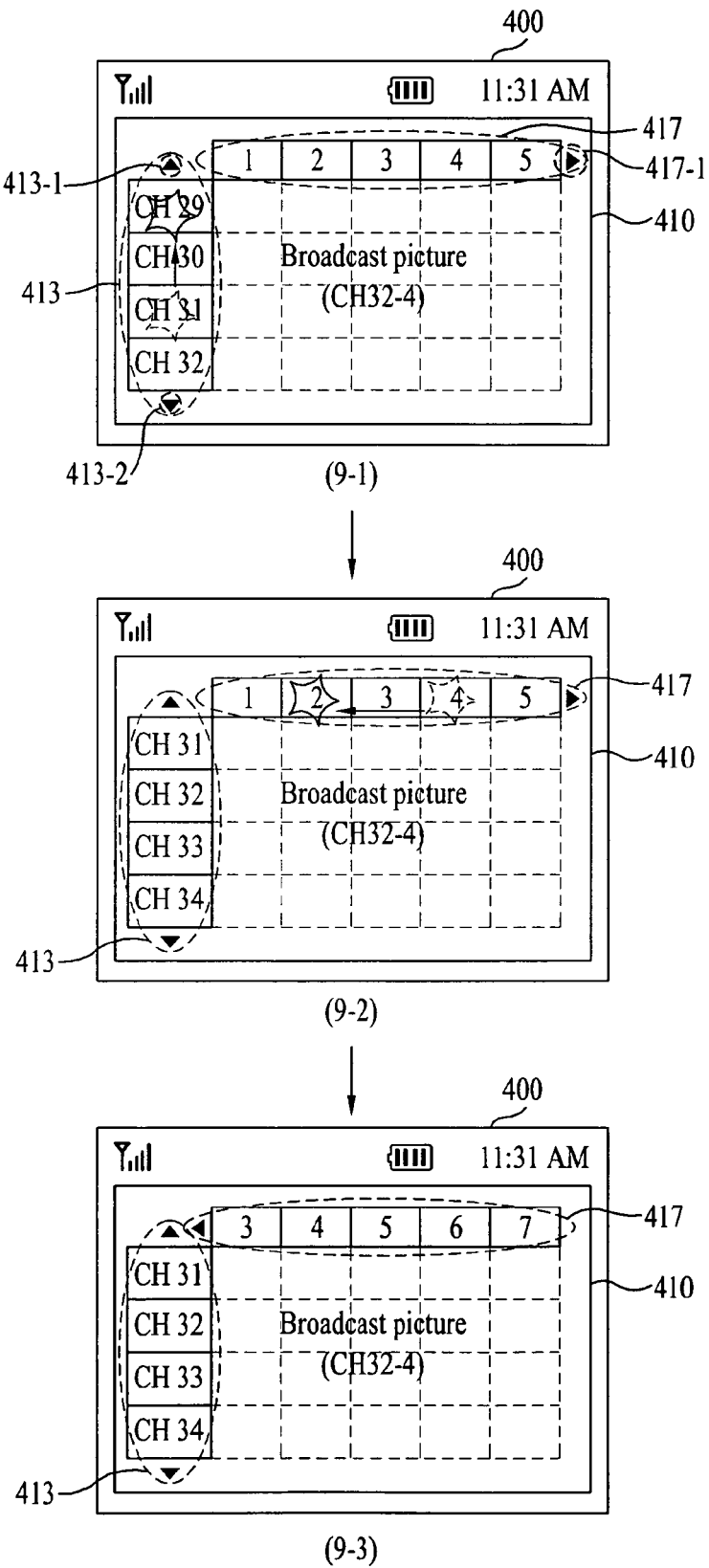
FIG. 9 includes overviews of display screens illustrating a method of controlling a mobile terminal according to another embodiment of the present invention.

As shown in (9-1) of FIG. 9, the controller 180 displays the broadcast channel list region 413 and the broadcast service list region 417 on the touchscreen 400. In the broadcast channel list region 413, first indicators 413-1 and 413-2, which indicate that there are other broadcast channels failing to be displayed due to spatial limitation, are displayed on the touchscreen 400. In addition, in the broadcast service list region 417, second indicators 417-1 and 417-2, which indicate that there are other broadcast services failing to be displayed due to spatial limitation, are also displayed on the touchscreen 400.

In this example, the indicators are displayed as scroll icons. Thus, the broadcast channel list region 413 can be touched and then dragged (or flicked) bottom to top to scroll through the broadcast channel list region or the broadcast service list region 417.

In more detail, as shown in (9-2) of FIG. 9, broadcast channels of the broadcast channel list region 413 are scrolled bottom to top according to the touch and drag operation, whereby new channels CH33 and CH34, which were not provided in (9-1) of FIG. 9, are displayed. Similarly, if the broadcast channel list region 413 is touched and then dragged (or flicked) top to bottom, the broadcast channels of the broadcast channel list region 413 are scrolled top to bottom.

Also, the broadcast service list region 417 can also be touched and then dragged (or flicked) right to left. Then, as shown in (9-3) of FIG. 9, broadcast services of the broadcast service list region 417 are scrolled right to left according to the touch and drag operation, whereby new broadcast services CH-6 and CH-7, which were not provided in (9-1) of FIG. 9, are displayed. Similarly, if the broadcast service list region 417 is touched and then dragged (or flicked) left to right, the broadcast services of the broadcast service list region 417 are scrolled left to right.

Therefore, a terminal user can easily search specific broadcast channel service information by performing a touch and drag of flickering operation on the broadcast channel list region 413 and the broadcast service list region 417.

A method of controlling a mobile terminal according to yet another embodiment of the present invention will now be described with respect to FIG. 10. In more detail, as shown in (10-1) of FIG. 10, the broadcast channel list region 413 is displayed on the touchscreen 400 only. A specific broadcast channel is then selected from the broadcast channel list 413 by being touched.

Figure 10:
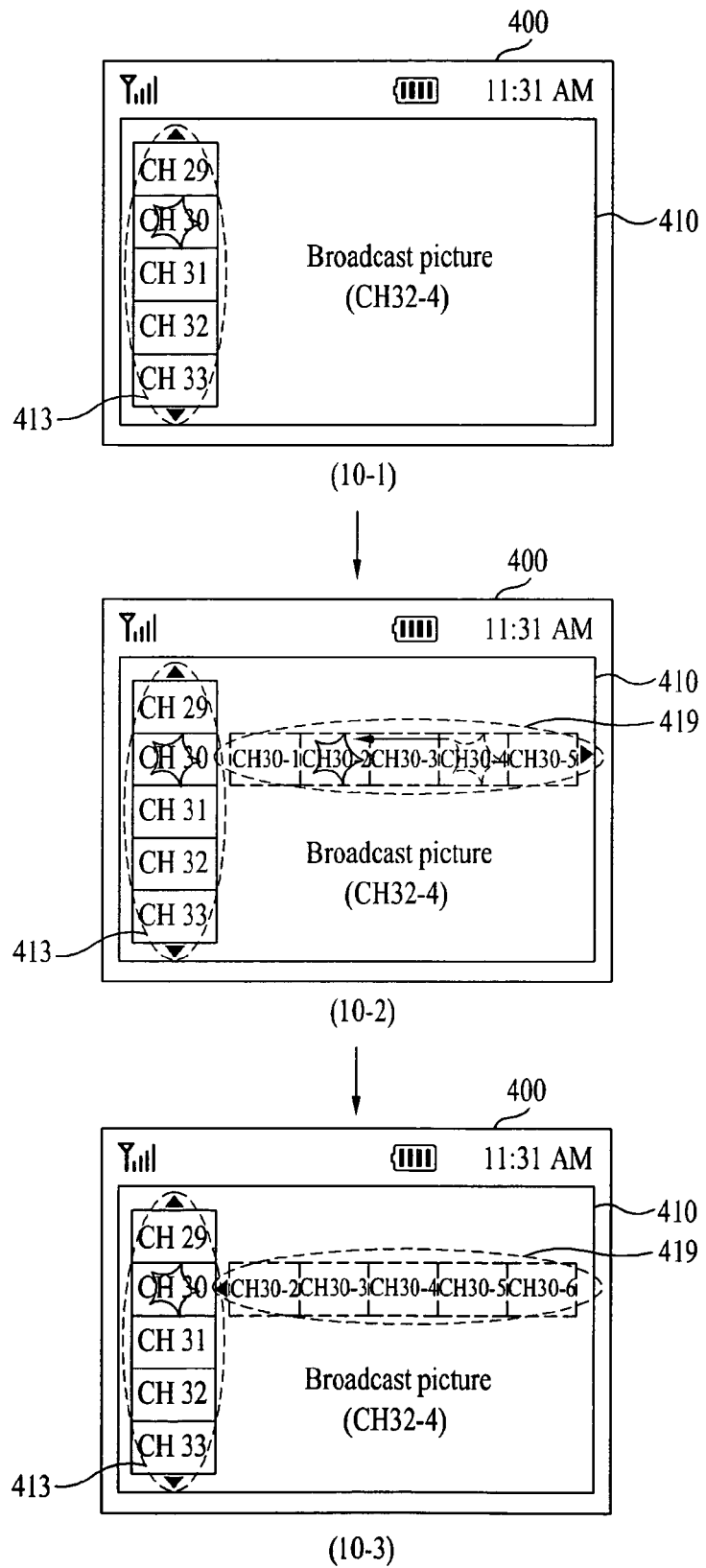
FIG. 10 includes overviews of display screens illustrating a method of controlling a mobile terminal according to another embodiment of the present invention.

Then, as shown in (10-2) of FIG. 10, the controller 180 simultaneously displays at least two of the broadcast channel service information corresponding to the selected broadcast channel. In addition, when all of the broadcast channel service informations belonging to the selected broadcast channel are difficult to be displayed due to spatial limitation, the rest of the broadcast channel service information can be displayed by touching and dragging the broadcast channel service information as shown in (10-2) and (10-3) of FIG. 10.

Thus, after a prescribed broadcast channel has been selected from the broadcast channel list 413, at least two of the broadcast channel service informations corresponding to the selected broadcast channel can be simultaneously displayed. This feature is also applicable to the embodiments shown in FIGS. 6 to 9.

A method of controlling a mobile terminal according to still another embodiment of the present invention will now be explained with reference to FIG. 11. Referring to (11-1) of FIG. 11, the controller 180 displays the broadcast picture area 410, the broadcast channel list region 413 and the broadcast service list region 417 on the touchscreen 400.

In this instance, the resolution of each of the broadcast channel list region 413 and the broadcast service list region 417 is adjusted. In more detail, as shown in (11-2) of FIG. 11, the resolution of each of the broadcast channel list region 413 and the broadcast service list region 417 is reduced, and thus more broadcast channels and services can be displayed in a single screen than those shown in (11-1) of FIG. 11.

Hence, a terminal user is able to control at least one of the number of the broadcast channels displayed and the number of the broadcast services displayed in the single screen by adjusting the resolution of each of the broadcast channel list region 413 and the broadcast service list region 417 through appropriate key manipulation of the user input unit 130. The controller 180 can also automatically adjust the font size or resolution based on the number of channels and services.

Next, a method of controlling a mobile terminal according to still another embodiment of the present invention will be explained with reference to FIG. 12. As shown in (12-1) of FIG. 12, instead of sequentially listing all channels on the broadcast channel list 413, the controller 180 displays partial channels (e.g., CH29, CH31, CH32, CH34, . . . ) and does not display the rest of the channels (e.g., . . . , CH30, CH33, . . . ).

In addition, the rest of the channels may correspond to channels having failed to be scanned during a broadcast channel scan procedure or scanned channels currently in a poor reception status. The partial channels may also correspond to the channels preset as preferred channels by a terminal user. Further, the preferred channel setting can be done through appropriate key manipulation of the user input unit 130.

Figure 12:
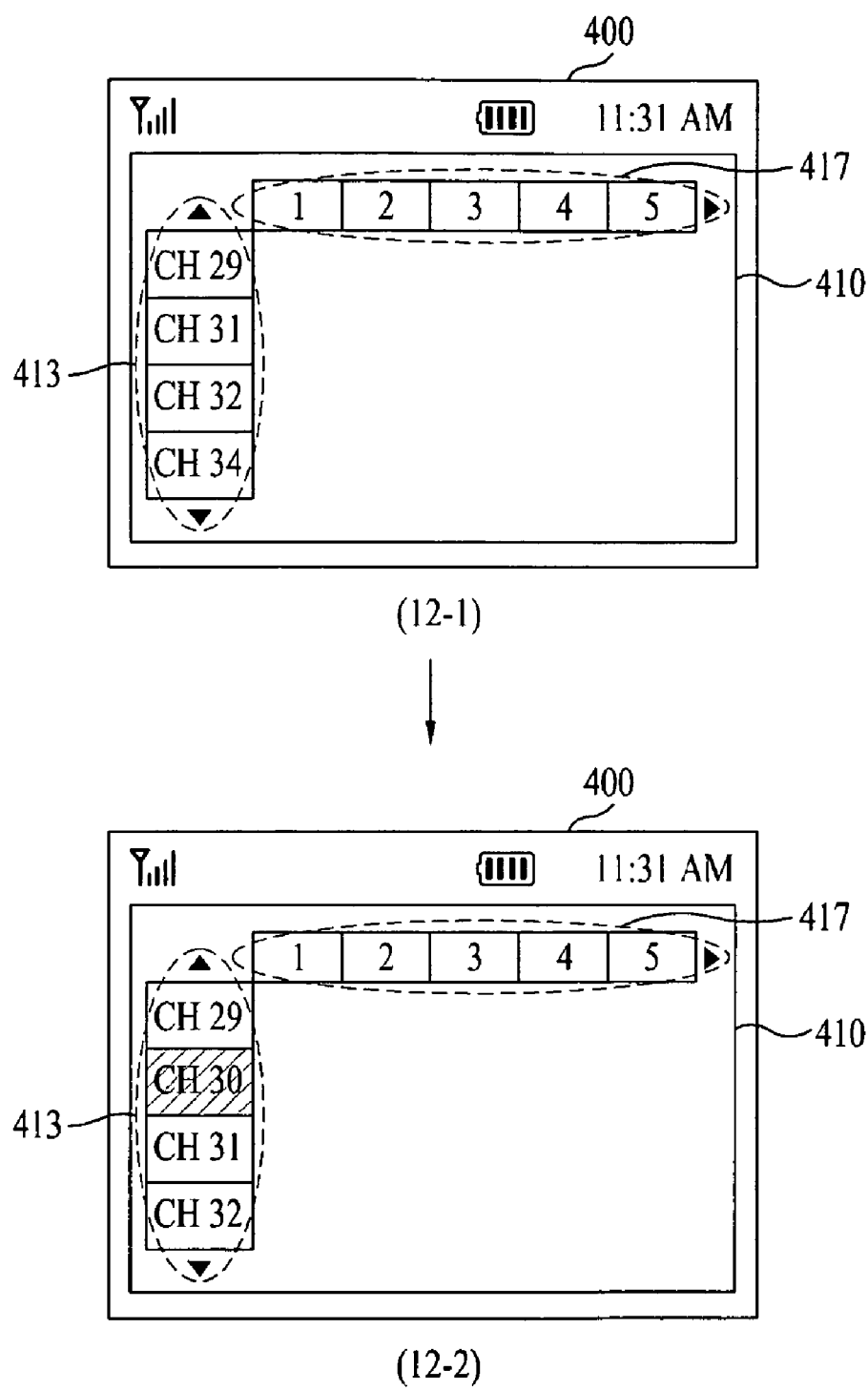
FIG. 12 includes overviews of display screens illustrating a method of controlling a mobile terminal according to still another embodiment of the present invention.

As shown in (12-2) of FIG. 12, the controller 180 discriminately displays the partial channel (e.g., CH30) among the channels in the broadcast channel list 413. As discussed above, the partial channel may correspond to at least one of the broadcast channels having failed to be scanned during the broadcast channel scan procedure, the channel currently in poor reception despite being scanned during the broadcast channel scan procedure, and the channel preset as a preferred channel by a terminal user.

Figure 13:
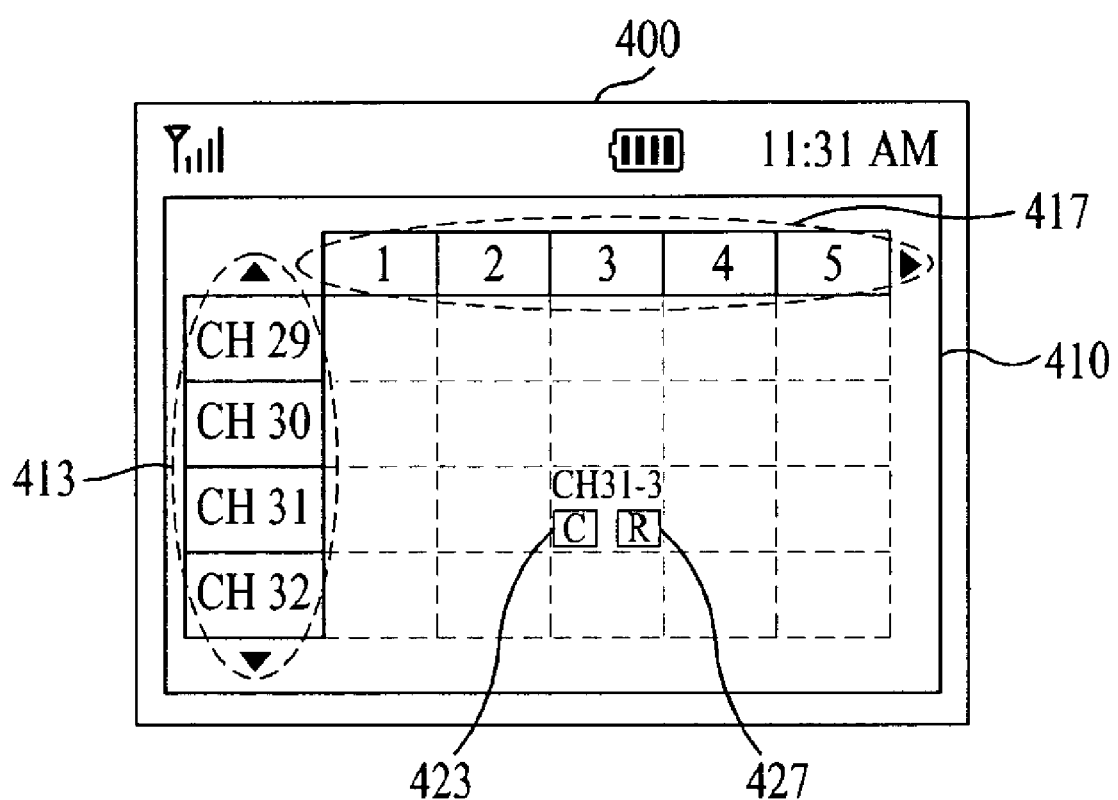
FIG. 13 is an overview of a display screen illustrating a method of controlling a mobile terminal according to still yet another embodiment of the present invention.

A method of controlling a mobile terminal according to still yet another embodiment of the present invention will now be explained with reference to FIG. 13. As shown in FIG. 13, the controller 180 displays a first icon 423 for a broadcast channel switching operation and a second icon 427 for another additional function (e.g., a recording reservation or a preferred channel registration) as well as the broadcast channel service information.

Then, if the first icon 423 is selected, the controller 180 switches a broadcast channel to the broadcast channel service. Also, if the second icon 427 is selected, the controller 180 displays a screen for an additional function (e.g., a recording reservation or a preferred channel registration) relevant to the broadcast channel service.

Next, a method of controlling a mobile terminal according to another embodiment of the present invention will be described with reference to FIG. 14. As shown in (14-1) and (14-2) of FIG. 14, if a terminal user requests the broadcast channel list region 413 and the broadcast service list region 417 be displayed, the controller 180 displays broadcast channel service information relevant to a broadcast picture currently displayed in the broadcast picture area 410 as a default even if a proximity touch is not performed on the broadcast picture area 410.

Moreover, a range of a broadcast channels to be displayed in the broadcast channel list and a range of the broadcast services to be displayed in the broadcast service list can be configured to be automatically determined so that the broadcast channel service information is located at a central portion of the broadcast picture area 410 or the touchscreen 400 when being displayed as a default. Further, the central part does not need to be a precise central part theoretically and just covers a portion that can be considered an approximately central part.

In addition, in another embodiment, the controller 180 displays a list of broadcast contents rather than or in addition to the corresponding broadcast services. The broadcast content includes genres such as movies, sports, news, etc. Thus, the user can view different types of programs by selecting a broadcast content for a particular channel.

Accordingly, the present invention provides several advantages.

For example, the present invention facilitates a terminal user to select a specific broadcast channel from a plurality of broadcast channels received by a mobile terminal. In addition, various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments may also be implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

According to the above embodiments of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via the Internet).

The mobile terminal 100 may also be implemented in a variety of different configurations. Examples of such configurations include folder-type, slide-type, bar-type, rotational-type, swing-type and combinations thereof Further, the embodiments of the present invention are applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal comprising:
    a broadcast receiving unit;
    a touchscreen including a broadcast picture area configured to display a broadcast picture received by the broadcast receiving unit; and
    a controller configured to display on the touchscreen a broadcast channel list including a list of broadcast channels in a first direction, and to display on the touchscreen a broadcast service list including a list of broadcast services corresponding to respective broadcast channels in a second direction different than the first direction.

2. The mobile terminal of claim 1, wherein each corresponding broadcast channel has a predetermined bandwidth, and the broadcast services of the corresponding broadcast channel are within the predetermined bandwidth for the corresponding broadcast channel.

3. The mobile terminal of claim 1, wherein the first direction is perpendicular to the second direction.

4. The mobile terminal of claim 1, wherein the first direction is parallel with a left side or right side of the touch screen and the second direction is parallel with a top side or bottom side of the touch screen.

5. The mobile terminal of claim 1, wherein the controller is further configured to display a grid pattern corresponding to the list of displayed broadcast channels and broadcast services.

6. The mobile terminal of claim 1, wherein when a position on the touch screen is touched or selected, the controller is further configured to display broadcast channel service information including a broadcast channel and a broadcast service corresponding to the touched or selected position on the touch screen, and
    wherein the controller is further configured to display the broadcast channel service information in a manner of being overlapped or not being overlapped on the broadcast picture area.

7. The mobile terminal of claim 1, wherein the controller is further configured to display the broadcast channel list and the broadcast service list to be at least partially overlapped with the broadcast picture area or not to overlap the broadcast picture area.

8. The mobile terminal of claim 1, wherein when the broadcast channel list is touched and dragged along the first direction, the controller is further configured to scroll the broadcast channel list in the dragged direction, and when the broadcast service list is touched and dragged along the second direction, the controller is further configured to scroll the broadcast service list in the dragged direction.

9. The mobile terminal of claim 1, wherein the controller is further configured to first display on the touchscreen the broadcast channel list, and then to display on the touchscreen the broadcast service list corresponding to a selected broadcast channel from the broadcast list only when the corresponding broadcast channel is selected.

10. The mobile terminal of claim 1, wherein the controller is further configured to receive a resolution change input command and to adjust a resolution of the list of broadcast channels and the list of broadcast services based on the resolution change input command.

11. The mobile terminal of claim 1, wherein the controller is further configured to distinctively display at least one broadcast channel in the broadcast channel list that has not been successfully scanned or has a reception quality below a predetermined reception quality.

12. The mobile terminal of claim 1, wherein the controller is further configured to display an icon for switching a broadcast channel when the broadcast channel and corresponding broadcast service is touched, and to display an icon for recording a broadcast program on the corresponding broadcast channel and broadcast service.

13. The mobile terminal of claim 1, wherein controller is further configured to display the broadcast channel service information corresponding to a currently broadcast program when the broadcast channel list and the broadcast services list are displayed.

14. A method of controlling a mobile terminal, the method comprising:
    displaying a received broadcast picture on a broadcast picture area of a touchscreen of the mobile terminal;
    displaying on the touchscreen a broadcast channel list including a list of broadcast channels in a first direction; and
    displaying on the touchscreen a broadcast service list including a list of broadcast services corresponding to respective broadcast channels in a second direction different than the first direction.

15. The method of claim 14, wherein each corresponding broadcast channel has a predetermined bandwidth, and the broadcast services of the corresponding broadcast channel are within the predetermined bandwidth for the corresponding broadcast channel.

16. The method of claim 14, wherein the first direction is perpendicular to the second direction.

17. The method of claim 14, wherein the first direction is parallel with a left side or right side of the touch screen and the second direction is parallel with a top side or bottom side of the touch screen.

18. The method of claim 14, further comprising:
displaying a grid pattern corresponding to the list of displayed broadcast channels and broadcast services.

19. The method of claim 14, wherein when a position on the touch screen is touched or selected, the method further comprises displaying broadcast channel service information including a broadcast channel and a broadcast service corresponding to the touched or selected position on the touch screen, and displaying the broadcast channel service information in a manner of being overlapped or not being overlapped on the broadcast picture area.

20. The method of claim 14, further comprising:
displaying the broadcast channel list and the broadcast service list to be at least partially overlapped with the broadcast picture area or not to overlap the broadcast picture area.

21. The method of claim 14, wherein when the broadcast channel list is touched and dragged along the first direction, the method further comprises scrolling the broadcast channel list in the dragged direction, and when the broadcast service list is touched and dragged along the second direction, scrolling the broadcast service list in the dragged direction.

22. The method of claim 14, further comprising:
first displaying on the touchscreen the broadcast channel list; and
then displaying on the touchscreen the broadcast service list corresponding to a selected broadcast channel from the broadcast list only when the corresponding broadcast channel is selected.

23. The method of claim 14, further comprising:
receiving a resolution change input command and to adjust a resolution of the list of broadcast channels and the list of broadcast services based on the resolution change input command.

24. The method of claim 14, further comprising:
distinctively displaying at least one broadcast channel in the broadcast channel list that has not been successfully scanned or has a reception quality below a predetermined reception quality.

25. The method of claim 14, further comprising:
displaying an icon for switching a broadcast channel when the broadcast channel and corresponding broadcast service is touched, and an icon for recording a broadcast program on the corresponding broadcast channel and broadcast service.

26. The method of claim 14, further comprising:
displaying the broadcast channel service information corresponding to a currently broadcast program when the broadcast channel list and the broadcast services list are displayed.

\* \* \* \* \*